(12) United States Patent
Lin et al.

(10) Patent No.: US 8,538,594 B2
(45) Date of Patent: Sep. 17, 2013

(54) METHOD FOR ASSIGNING TRANSMISSION LINE OF ELECTRIC NETWORK

(75) Inventors: Yi-Kuei Lin, Taipei (TW); Cheng-Ta Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 355 days.

(21) Appl. No.: 12/929,547

(22) Filed: Feb. 1, 2011

(65) Prior Publication Data
US 2012/0095611 A1    Apr. 19, 2012

(30) Foreign Application Priority Data

Oct. 19, 2010    (TW) ................................ 99135529 A (51) Int. Cl.
*H02J 3/00* (2006.01)
*G06F 1/26* (2006.01)

(52) U.S. Cl.
USPC ........................................ 700/292; 700/297

(58) Field of Classification Search
USPC ........................................ 700/286, 297, 292
See application file for complete search history.

(56) References Cited

U.S. PATENT DOCUMENTS

| 4,747,115 A | * | 5/1988 | Nambu | 375/347 |
| 5,731,887 A | * | 3/1998 | Fee | 398/5 |
| 5,798,939 A | * | 8/1998 | Ochoa et al. | 700/286 |

* cited by examiner

*Primary Examiner* — Charles Kasenge
(74) *Attorney, Agent, or Firm* — Bacon & Thomas, PLLC (57) ABSTRACT

A method for assigning transmission line of electric network, which is used to select an optimal transmission assignment from a plurality of transmission assignment, is disclosed. The steps of the method includes: assigning a transmission line between a source and a relay node and another transmission line between the relay node and a sink to form one of the transmission assignments, and the states of the two transmission line are different; computing a network reliability of each transmission assignment; executing an algorithm to generate two offspring transmission assignments for replacing two of the transmission assignments, and the network reliabilities of the two of the transmission assignments are minimum; computing the network reliabilities for the two offspring transmission assignments; and selecting one of the transmission assignments with the maximal network reliability being the optimal transmission assignment.

8 Claims, 3 Drawing Sheets

METHOD FOR ASSIGNING TRANSMISSION LINE OF ELECTRIC NETWORK

BACKGROUND OF THE INVENTION (1) Field of the Invention

The invention relates to a method for assigning transmission line, and especially relates to a method for assigning transmission line of electric network.

(2) Description of the Prior Art

Electric power which is like sunshine, air or water is a necessary condition for our modern life. It is a very critical issue to build a reliable electric network such that electric power can be stably supplied.

The conventional studies have discussed the issues of reliability evaluation or optimization for electric networks, and only concerned the transmission lines of the network structure with binary-state, normal or failed with a probability. In practice, the electric network should be stochastic because each transmission line is combined with several physical lines. Each physical line has binary state, providing a specific capacity or failure. In other word, the transmission line is multistate. Assigning one transmission line on each arc between every two nodes in the electric network is called as the transmission assignment, wherein each transmission line can be assigned to exact one arc and each arc must contain exact one transmission line. Therefore, the electric network with any transmission assignment has multistate, so is named as a stochastic electric network. The network reliability for one of the transmission assignments is defined as the probability of the supplier delivering the specific power demand to the requester via the electric network with said transmission assignment.

Hence, how to select one optimal transmission assignment with the maximal network reliability to provide the stabilization of delivering the specific power demand, to decrease the costs and to increase the earnings is an important issue.

SUMMARY OF THE INVENTION

Accordingly, the object of the invention is to provide a method for assigning transmission line to performance stable power delivery and to provide different power demand.

In one aspect, the invention provides a method for assigning transmission line of electric network, utilized to evaluate a network reliability for each of plural transmission assignments to select an optimal transmission assignment among the transmission assignments. Wherein each of transmission assignments has a source, at least one relay node, a sink, and plural transmission lines, and the transmission lines include a first transmission line and a second transmission line. The steps of the method include: assigning the first transmission line between the source and the relay node and the second transmission line between the relay node and the sink to form one of the transmission assignments, wherein the states of the first transmission line and the second transmission lines are different; computing the network reliability for each of transmission assignments, wherein the relational operators of the network reliability include the states of the first transmission line and the second transmission line; executing an algorithm to generate two offspring transmission assignments for replacing two of the transmission assignments, wherein the network reliabilities for the two of the transmission assignments are minimum; computing the network reliabilities for the two offspring transmission assignments; and selecting the optimal transmission assignment among the transmission assignments and the offspring transmission assignments, wherein the network reliability for the optimal transmission assignment is maximum.

In an embodiment, the relay node include a first relay node, a second relay node and a third relay node, the transmission lines include a third transmission line and a fourth transmission line, and the steps of the method further include: assigning the third transmission line between the first relay node and the second relay node and the fourth transmission line between the second relay node and the third relay node, wherein the sates of the third transmission line and the fourth transmission line are different.

In an embodiment, the step of computing the network reliability includes: distributing a power demand into two paths between the source and the sink, wherein the transmission lines are arranged to form the two paths, and each of the transmission lines has plural capacities and a maximal capacity; defining a current vector having a current of each of the paths, wherein the sum of the currents is equal to the power demand; selecting the current vector for satisfying the current smaller than or equal to the maximal capacity; transforming each of the current vectors into a corresponding capacity vector; comparing the value between every two of the capacity vectors, removing the larger capacity vector, and the rest of the capacity vector defined as d-MPs; and computing a probability for each of the capacity vectors lager than or equal to the d-MPs, and defining the probability as the network reliability.

In an embodiment, the algorithm include a genetic algorithm. The transmission assignments excluding the offspring transmission assignments are regarded as an initial population. The step of executing the algorithm includes: defining a count and a generation number, wherein the start value of the count is zero; adding one to the count when executing the algorithm every time; judging if the count equal to the generation number; executing a roulette wheel selection to select two of the transmission assignments when the count smaller than the generation number, wherein the two of the transmission assignments are defined as two parent transmission assignments; executing a crossover operation and a mutation operation to transform the two parent transmission assignments into two offspring transmission assignments. When the count equal to the generation number, selecting the optimal transmission assignment among the transmission assignments and the offspring transmission assignments, wherein the network reliability for the optimal transmission assignment is maximum; ceasing the algorithm when the count equal to the generation number.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described.

The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

For executing the method for assigning transmission line, a computer is utilized in the present invention to run a transmission line assigned software and to evaluate a network reliability for each of plural transmission assignments to select an optimal transmission assignment among the transmission assignments. The hardware is described as below. The computer has an input unit, an operating unit, a storage unit and an output unit. The input unit is a keyboard or a handwriting input device. The operating unit is a central processing unit (CPU). The storage unit is a hardware electrically connected to the input unit, the operating unit and the output unit. The transmission line assigned software is installed in the hardware. The output unit is a display or a printer.

The electric network includes a plurality of nodes and a plurality of transmission lines. The nodes includes a source, a sink and at least one relay node. A transmission assignment includes the source, the sink, the relay nodes and the transmission lines. Each transmission line is combined with several physical lines. The nodes includes a supplier and a requester such as substations or electric power generators, and the supplier is as the source and the requester is as the sink or the relay node. Let (V, A) represents the electric network, where V represents the nodes, $A=\{\alpha_i | 1 \leq i \leq n\}$ represents the number n of the arcs, and the arc is between two nodes. In the embodiment, the electric network provides the number m of the paths: $P_1, P_2, \ldots, P_m$, which are the minimal paths, and the path is composed of the arcs. The minimal path is an ordered set of the arcs between the source and the sink and no loops is in the ordered set.

Let $W=\{w_c | 1 \leq c \leq z\}$ represents the set of the transmission lines, where $w_c$ represents the cth transmission line. Each transmission line $w_c$ owns multiple states: $1, 2, \ldots, M_c$. Each transmission line is combined with several physical lines, with the corresponding available capacities: $0=h_c(1)<h_c(2)<\ldots<h_c(M_c)$, and the probability $Pr(h_c(1))$, $Pr(h_c(2))$, ..., $Pr(h_c(M_c))$, where $h_c(k)$ represents the capacity of the number k physical lines of the transmission line $w_c$, and $h_c(M_c)$ represents the maximal capacity of the transmission line $w_c$.

First, there are four assumptions before executing the transmission line assigned software.

1. No transmission line is assigned to any node.
2. Each transmission line can be assigned to exact one arc and each arc must contain exact one transmission line.
3. The states of transmission lines are statistically independent.
4. The electric current in electric network (V, A) must satisfy the current-conservation principle, i.e. no current will decrease or increase at arcs and nodes during power delivery.

Figure 1:
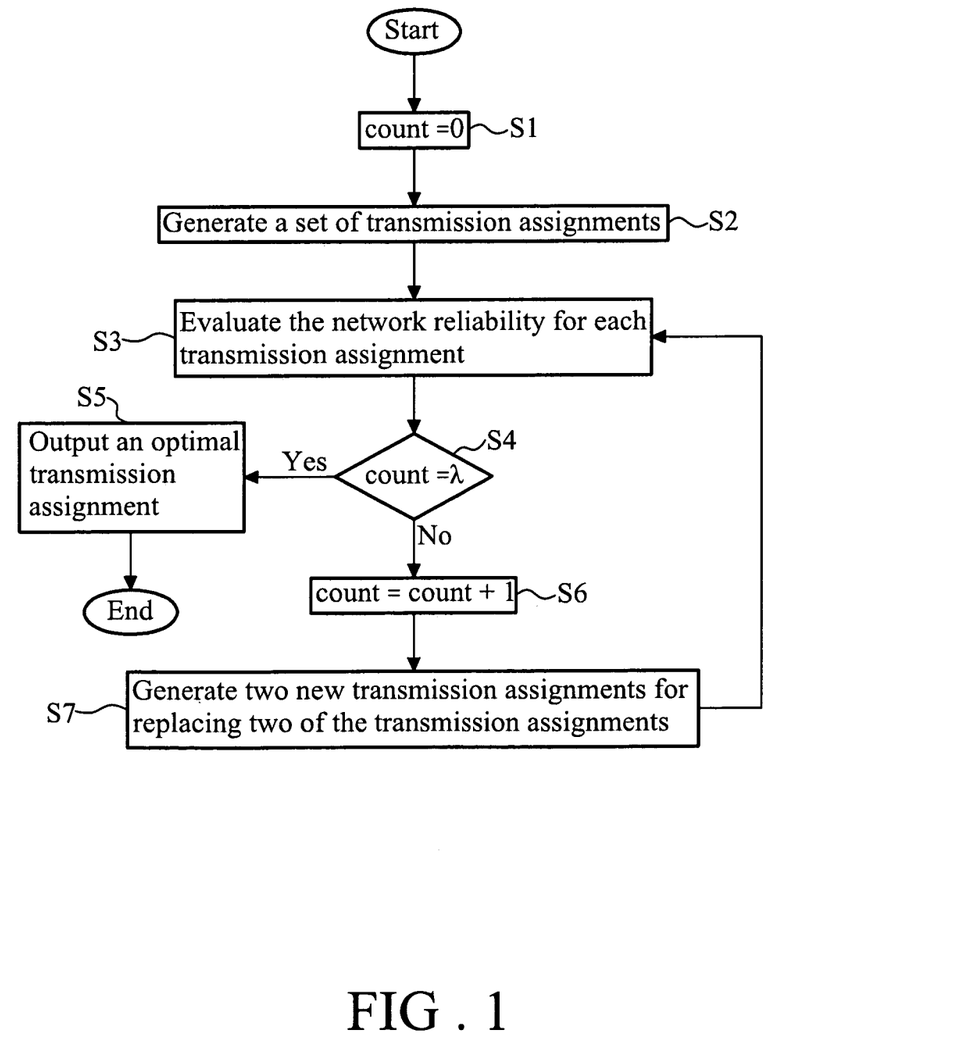
FIG. 1 is a flow chart showing the method for assigning transmission line of electric network.

Refer to FIG. 1 for a flow chart of executing the transmission line assigned software, and the transmission line assigned software utilizes a genetic algorithm for operation. The steps of the method for assigning transmission line of electric network are as below.

Step (S1): receive a power demand d, the number k of the capacities $h_c(k)$ and a maximal capacity $h_c(M_c)$ of each transmission line by a user inputting to the transmission line assigned software through the input unit, where k ∈ $\{1, 2, \ldots, M_c\}$. Meanwhile, define the initial parameters, which include a count and a generation number $\mathit{\Pi}$, and let the count as zero initially. Wherein the generation number $\mathit{\Pi}$ is set by an user of the method for assigning transmission line. The transmission lines include a first transmission line, a second transmission line, a third transmission line and a fourth transmission line. The number of the assigned transmission lines is much more than the number of the arcs between two nodes, so as to form multiple transmission assignments for selecting the optimal transmission assignment.

Step (S2): stochastically generate multiple transmission assignments, and the transmission assignments are regarded as an initial population. Illustrate the generation of the transmission assignments: assigning the first transmission line between the source and the relay node and the second transmission line between the relay node and the sink to form one of the transmission assignments, wherein the states of the first transmission line and the second transmission lines are different. Because the relay node is multiple, and include a first relay node, a second relay node and a third relay node. Furthermore, assign the third transmission line between the first relay node and the second relay node, and the fourth transmission line between the second relay node and the third relay node, wherein the sates of the third transmission line and the fourth transmission line are different. A transmission assignment is formed by said arrangement, and multiple transmission assignment are generated by stochastically changing said arrangement.

Step (S3): evaluate the network reliability for each transmission assignment of delivering the power demand from the source to the sink in the electric network by the operating unit, and storage the network reliability in the storage unit.

Step (S4): judge if the count equal to the generation number $\mathit{\Pi}$ set by the user. Go to the step (S6) when the count smaller than the generation number $\mathit{\Pi}$; go to the step (S5) when the count equal to the generation number $\mathit{\Pi}$; and cease the algorithm when the count larger than the generation number $\mathit{\Pi}$.

Step (S5): select the optimal transmission assignment among the transmission assignments when the count equal to the generation number $\mathit{\Pi}$, wherein the network reliability, which is stored in the storage unit by the step (S3), for the optimal transmission assignment is maximum. Finally, the optimal transmission assignment is displayed on the output unit.

Step (S6): add one to the count, so count=count+1.

Step (S7): generate two new transmission assignment, and the steps are: executing a roulette wheel selection to select two of the transmission assignment when the count smaller than the generation number $\mathit{\Omega}$, wherein the two of the transmission assignment are defined as two parent transmission assignments; executing a crossover operation and a mutation operation to transform the two parent transmission assignments into two new transmission assignment, which is called as two offspring transmission assignments; and replacing another two of the transmission assignments in the initial population with two offspring transmission assignments, wherein the network reliabilities for the another two of the transmission assignments are minimum.

Then, go back to the step (S3) for computing the network reliabilities for the two new transmission assignments, and repeat the step (S3) to the step (S7) until the count equal to the generation number $\mathit{\Omega}$, so the optimal transmission assignment is displayed.

Figure 2:
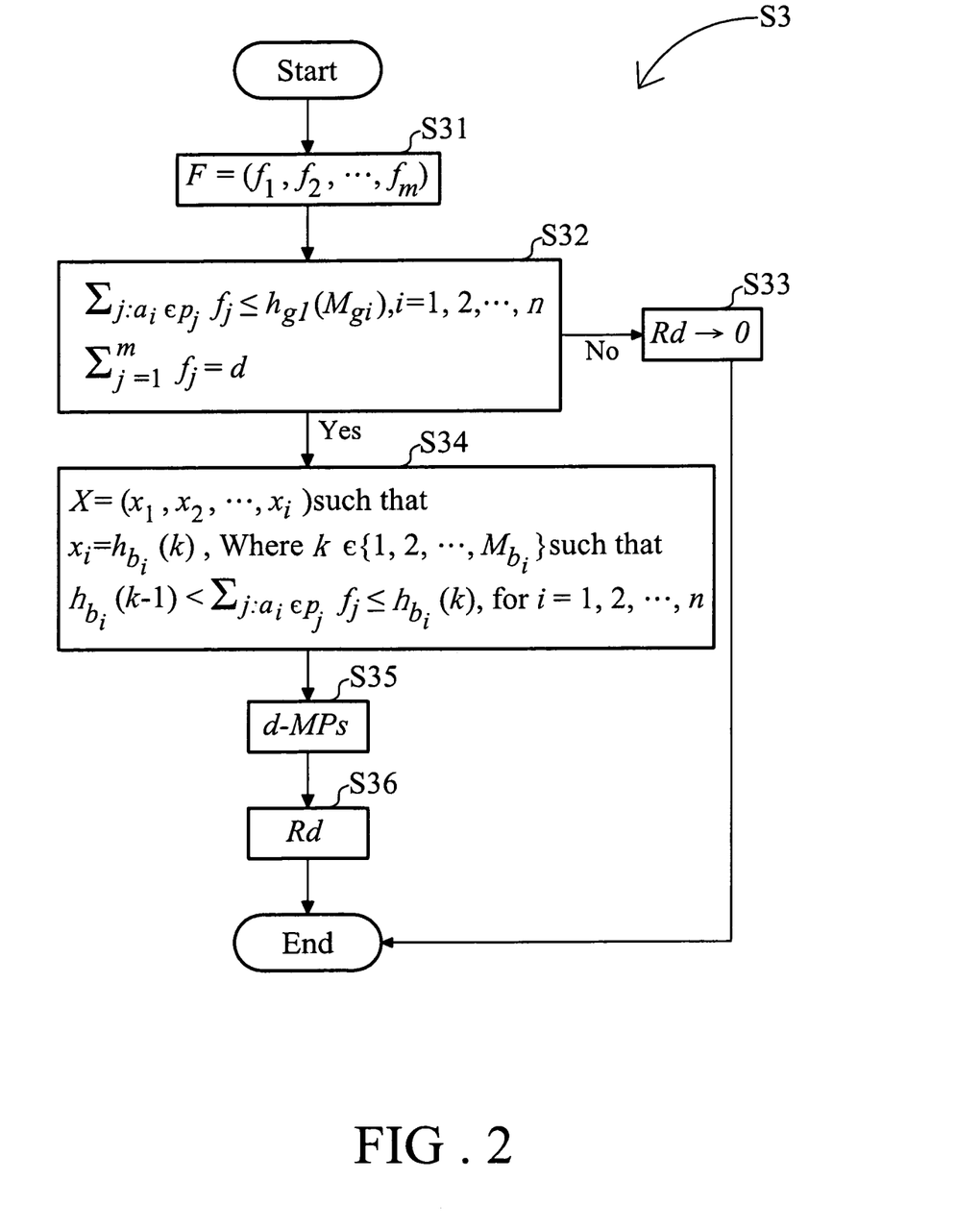
FIG. 2 is a flow chart of evaluating a network reliability for the transmission assignment.

Refer to FIG. 2 for a flow chart of evaluating the network reliability for each transmission assignment in the step (S3). The steps of evaluation procedure are as below.

Step (S31): distribute a power demand into two paths between the source and the sink, wherein the transmission lines are arranged to form the two paths; and define a current vector $F=(f_1, f_2, \ldots, f_m)$ having a current of each of the paths for transmitting the power demand, wherein each current is the power through each path between the source and the sink.

Step (S32): select the current vector for satisfying the current smaller than or equal to the maximal capacity. In other word, judge if the current vector satisfy the equation: $\Sigma_{j:\alpha_i^{\epsilon P}} f_j \leq \Box h_{gi}(M_{gi})$, i=1, 2, ... n, wherein the sum of the currents is equal to the power demand for satisfying $\Sigma_{j=1}^{m} f_j = d$. If at least one current vector is selected, then go to the step (S34); else if, go to the step (S33).

Step (S33): define the network reliability $R_d$ as a minimal value, and end the loop of the step (S3). Propagate the value of the network reliability $R_d$ to the step (S3) of FIG. 1, and go to next step (S4).

Step (S34): transform each of the current vectors into a corresponding capacity vector $X=(x_1, x_2, \ldots, x_i)$ by the operating unit, wherein the capacity vector $X=(x_1, x_2, \ldots, x_i)$ is composed of a capacity of each transmission line. The transformation equation is: $xi=h_{gi}(k)$, where $k \in \{1, 2, \ldots, M_{gi}\}$ such that $h_{gi}(k-1)<\Sigma_{j:\alpha_i \epsilon P_j} \leq h_{gi}(k)$, for i=1,2, ..., n.

Step (S35): comparing the value between every two of the capacity vectors, removing the larger capacity vector, and the rest of the capacity vector defined as a lower boundary vector d-MP.

Step (S36): computing a probability for each of the capacity vectors lager than or equal to the lower boundary vector d-MP, and defining the probability as the network reliability $R_d$. After end the loop of the step (S3), propagate the value of the network reliability $R_d$ to the step (S3) of FIG. 1, and go to next step (S4).

In an embodiment, illustrate the method for assigning transmission line of electric network is utilized to select an optimal transmission assignment among with the maximum network reliability. The method is combined with the genetic algorithm (GA), the minimal paths (MP) algorithm and the recursive sum of disjoint (RSDP) products.

Let the transmission assignment as a chromosome, represented by $G=(g_1, g_2, \ldots, g_n)$, where $g_i \in \{1, 2, \ldots, z\}$ means that transmission line $w_c$ is assigned to the arc $\alpha_i$ if $g_i$=c. When the transmission assignment is selected, the stochastic electric network is represented by two vectors: the current vector $F=(f_1, f_2, \ldots, f_m)$ and the capacity vector $X=(x_1, x_2, \ldots, x_i)$.

The network reliability is defined as the probability of the supplier successfully transmitting the d unit of the power demand to the requester, represented by $R_d(G)$.

Step 1: Set the initial parameters: the population θ, the crossover probability α, the mutation probability β and the generation number $\mathit{\Omega}$. Initially, let the count=0.

Step 2: Randomly generate initial population θ of the chromosomes: $\{G_1, G_2, \ldots, G_\theta\}$ by using the integer coding.

Step 3: Evaluate the network reliability $R_d(G)$ for each chromosome as follows.

1. Find all current vectors F satisfying the following constraints:

$$\Sigma_{j:\alpha_i \epsilon Pj} f_j \leq h_{gi}(M_{gi}), i=1, 2, \ldots, n \quad (1)$$

$$\Sigma_{j=1}^{m} f_j = d.$$

2. If there is no current vector F satisfying constraints (1) and (2), a minimal value is assigned to be the network reliability of the chromosome. Then, evaluate the network reliability for next chromosome.

3. Transform each current vector F into a corresponding capacity vector X via the following equations:

$$xi=h_{gi}(k) \text{ where } k \in \{1, 2, \ldots, M_{gi}\} \text{ such that}$$
$$h_{gi}(k-1)<\Sigma_{j:\alpha_i \epsilon Pj} f_j \leq h_{gi}(k), \text{ for } i=1, 2, \ldots, n. \quad (3)$$

4. Check which the d-MP candidates are d-MPs. Utilize the d-MP judgment algorithm to obtain all d-MPs among the capacity vectors X In other words, compare the value between every two of the capacity vectors, removing the larger capacity vector, and the rest of the capacity vector defined as the d-MP.

4.1 I=Ø (I is the stack that stores the index of non d-MP in $\mathit{\Omega}$. Initially, I is empty.)

4.2 For i=1 to k and i ∉ I.

4.3 For j=1+1 to k, and j ∉ I.

4.4 If $X_i < X_j$, then $X_j$ is not a d-MP, I=I ∪ {j}. Else, $X_i$ is not d-MP, I=I ∪ {i} and go to step 4.7.

4.5 Next j, j=j+1.

4.6 $X_i$ is a d-MP.

4.7 Next i, 1=i+1.

5. Suppose the capacity vectors $X_1, X_2, \ldots, X_q$ are d-MPs. Evaluate network reliability $R_d(G)=\Pr\{\cup_{i=1}^{q}\{X|X \geq X_1, X \in U_G\}\}$ by the RSDP algorithm.

Step 4: If the count is equal to the generation number, i.e., count=λ, output an optimal solution, which is the optimal transmission assignment with the maximum network reliability. If count>λ, cease the algorithm; else if count<λ, count=count+1 and go to the step 5.

Step 5: Execute the evolution process. Employ the roulette wheel selection to select two of the parent chromosomes in the initial population, and execute a crossover operation and a mutation operation to transform the two parent chromosomes into two offspring chromosomes. The evolution process is illustrated as follows.

Firstly, select two of the parent chromosomes and copy them. Suppose that two selected parent chromosomes from the population θ of the parent chromosomes are (5, 2, 7, 4, 8, 3) and (4, 2, 1, 7, 3, 6). The stage of the crossover operation is shown as Table 1 and a random binary vector CV is firstly generated. If $cv_\pi=1$ and $\pi \in \{1, 2, \ldots, n\}$, gene $g_\pi$ in the firstly selected parent chromosome exchanges with gene $g_\pi$ in the secondly selected parent chromosome. Suppose CV=(1, 0, 1, 0, 0, 0) and then the $1^{st}$ gene $g_1$ and the $3^{rd}$ gene $g_3$ of the two parent chromosomes exchange with each other to be (4, 2, 1, 4, 8, 3) and (5, 2, 7, 7, 3, 6). Since the value of the gene $g_4$ in the $1^{st}$ parent chromosome is the identical with the value of the gene $g_1$, the value of the gene $g_4$ must be changed randomly to be the value of the genes $g_2$, $g_4$, $g_5$, or $g_6$ in the $2^{nd}$ parent chromosome. In order to avoid any duplicate gene, the value of the gene $g_4$ in the $1^{st}$ parent chromosome may become the value of the genes $g_4$ or $g_6$ in the $2^{nd}$ parent chromosome. Suppose the $1^{st}$ parent chromosome becomes an offspring chromosome of the first generation, (4, 2, 1, 6, 8, 3). Similarly, the $2^{nd}$ chromosome becomes another offspring chromosome of the first generation, (5, 2, 7, 8, 3, 6).

TABLE 1

The stage of the crossover operation.
CV = (1, 0, 1, 0, 0, 0)

| Parents of 1st generation | Procedure | Offspring of 1st generation |
|---|---|---|
| (5, 2, 7, 4, 8, 3) | (|4, 2, |1, 4, 8, 3) | (4, 2, 1, 6, 8, 3) |
| (4, 2, 1, 7, 3, 6) | (|5, 2, |7, 7, 3, 6) | (5, 2, 7, 8, 3, 6) |

Secondly, the stage of mutation operation is shown as Table 2 and a mutation point Mup is firstly randomly generated. Two conditions are considered in the mutation operation and the mutation point Mup=2 is supposed. In one condition, the offspring chromosome of the $1^{st}$ generation (4, 2, 1, 6, 8, 3) is regarded as a parent chromosome of the second generation. If the value of the gene $g_2$ in the parent chromosome of the $2^{nd}$ generation (4, 2, 1, 6, 8, 3) changes from 2 to 3, then the genes $g_2$ and $g_6$ exchange. Then the parent chromosome of the $2^{nd}$ generation (4, 2, 1, 6, 8, 3) becomes (4, 3, 1, 6, 8, 2). In another condition, the offspring chromosome of the $1^{st}$ generation (5, 2, 7, 8, 3, 6) is regarded as anther parent chromosome of the second generation. If the value of the value $g_2$ in the parent chromosome of the $2^{nd}$ generation (5, 2, 7, 8, 3, 6) changes from 2 to 1, then the chromosome becomes (5, 1, 7, 8, 3, 6). Thus, the offspring chromosomes of the second generation are (4, 3, 1, 6, 8, 2) and (5, 1, 7, 8, 3, 6).

TABLE 2

The stage of the mutation operation.
Mup = 2

| Parents of 2nd generation | Procedure | Offspring of 2nd generation |
|---|---|---|
| (4, 2, 1, 6, 8, 3) | (4, 2→3, 1, 6, 8, 3→2) | (4, 3, 1, 6, 8, 2) |
| (5, 2, 7, 8, 3, 6) | (5, 2→1, 7, 8, 3, 6) | (5, 1, 7, 8, 3, 6) |

The offspring chromosomes are generated by said evolution process. Then, the two offspring chromosomes replace another two of the parent chromosomes in the initial population and a new population is generated, wherein the network reliabilities for another two of the parent chromosomes are minimum.

Step 6: Evaluate the network reliability $R_d(G)$ for the two offspring chromosomes in the new population of the parent chromosome by the step 3 to the step 4. Repeat said steps until the count is equal to the generation number, i.e., count=λ, and output an optimal solution, which is the optimal transmission assignment with the maximum network reliability.

Figure 3:
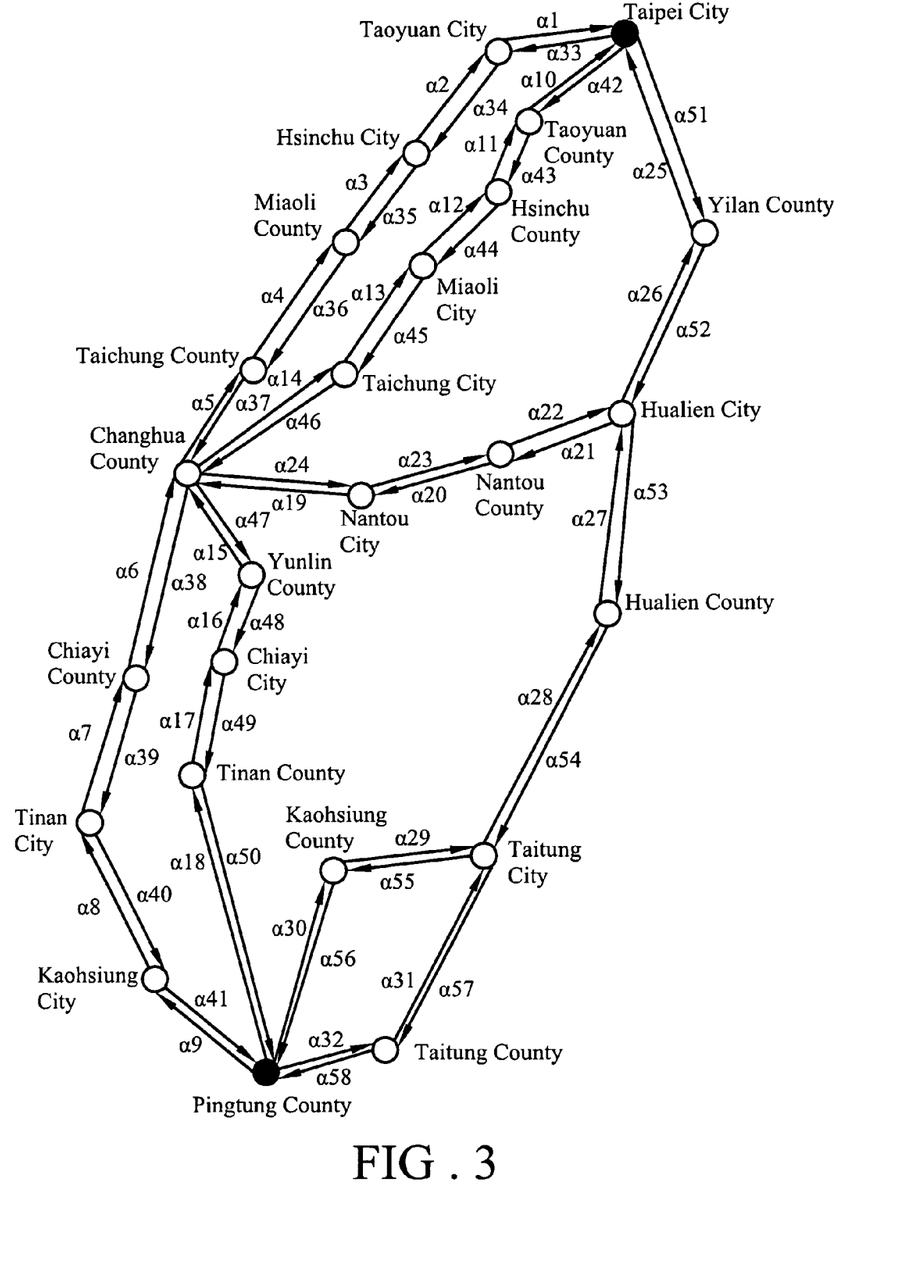
FIG. 3 is a schematic view of the electric network.

Refer to FIG. 3 for a schematic view of the electric network, for example, the Taiwan power transmission network (TPTN) topology, where each node denotes a substation, which is a subsidiary station of an electric power generation, transmission, and distribution system. The voltage is transformed from high to low or the reverse using transformers. The $1^{st}$ and the $2^{nd}$ nuclear power plants at north Taiwan mainly supply the electric power to Taipei City. However, the $3^{rd}$ nuclear power plant at Pingtung County in south Taiwan is needed to transmit the electric power to Taipei City due to high regional demand. The Taiwan Power Company (TPC) thus pays much attention to search for the optimal transmission lines assignment with maximal network reliability to decrease the cost and increase the performance index for the TPTN.

There are 85 transmission lines in the TPC which are ready to be assigned to the TPTN as shown in Tables 3 and 4. Each transmission line combines with several physical lines and each physical line owns two states: providing 100 megawatt (MW) if normal or 0 MW if failure. For example, the transmission line combining with three physical lines has four states: 0 MW, 100 MW, 200 MW, and 300 MW, where each physical line fails with probability 0.1. If there exists no physical line in failure, the transmission line provides 300 MW with probability $C_0^3 (0.9)^3 (0.1)^0 = 0.729$. Similarly, the transmission line provides 200 MW with probability $C_1^3 (0.9)^2 (0.1)^1 = 0.243$; 100 MW with probability $C_2^3 (0.9)^1 (0.1)^2 = 0.027$; and 0 MW with probability $C_3^3 (0.9)^0 (0.1)^3 = 0.001$. All transmission lines have different probability distributions due to various manufacturers.

TABLE 3

Probability distribution of the states for 85 transmission lines.

| Transmission line $w_c$ | Capacity | | | | | |
|---|---|---|---|---|---|---|
| | 0 MW | 100 MW | 200 MW | 300 MW | 400 MW | 500 MW |
| 1 | 0.00000133634 | 0.000151871 | 0.00647237 | 0.122594303 | 0.87078012 | 0$^a$ |
| 2 | 0.0000007776 | 0.000060912 | 0.001908576 | 0.029901024 | 0.234224688 | 0.733904022 |
| 3 | 0.000001 | 0.000297 | 0.029403 | 0.970299 | 0 | 0 |
| 4 | 0.028 | 0.972 | 0 | 0 | 0 | 0 |
| 5 | 0.000225 | 0.02955 | 0.970225 | 0 | 0 | 0 |
| 6 | 0.000857375 | 0.024502875 | 0.233422125 | 0.741217625 | 0 | 0 |
| 7 | 0.00000253553 | 0.000154133 | 0.003747872 | 0.04556623 | 0.276994714 | 0.673534515 |
| 8 | 0.00000001188 | 0.00000222547 | 0.000166739 | 0.00624631 | 0.1169982 | 0.876586513 |
| 9 | 0.00000558406 | 0.000285791 | 0.005850686 | 0.059887357 | 0.306502145 | 0.627468437 |
| 10 | 0.000512 | 0.017664 | 0.203136 | 0.778688 | 0 | 0 |
| 11 | 0.1 | 0.9 | 0 | 0 | 0 | 0 |
| 12 | 0.097 | 0.903 | 0 | 0 | 0 | 0 |
| 13 | 0.0121 | 0.1958 | 0.7921 | 0 | 0 | 0 |
| 14 | 0.000484 | 0.043032 | 0.956484 | 0 | 0 | 0 |
| 15 | 0.000004096 | 0.000755712 | 0.046476288 | 0.952763904 | 0 | 0 |

TABLE 3-continued

Probability distribution of the states for 85 transmission lines.

| Transmission line $w_c$ | Capacity | | | | | |
|---|---|---|---|---|---|---|
| | 0 MW | 100 MW | 200 MW | 300 MW | 400 MW | 500 MW |
| 16 | 0.000001 | 0.000297 | 0.029403 | 0.970299 | 0 | 0 |
| 17 | 0.00004096 | 0.00188416 | 0.03250176 | 0.24918016 | 0.71639296 | 0 |
| 18 | 0.00003701506 | 0.001750148 | 0.031031466 | 0.244538564 | 0.722642807 | 0 |
| 19 | 0.000262144 | 0.011501568 | 0.168210432 | 0.820025856 | 0 | 0 |
| 20 | 0.059 | 0.941 | 0 | 0 | 0 | 0 |
| 21 | 0.000042875 | 0.003546375 | 0.097778625 | 0.898632125 | 0 | 0 |
| 22 | 0.000010648 | 0.001420056 | 0.063127944 | 0.935441352 | 0 | 0 |
| 23 | 0.000166375 | 0.008575875 | 0.147349125 | 0.843908625 | 0 | 0 |
| 24 | 0.001 | 0.999 | 0 | 0 | 0 | 0 |
| 25 | 0.00002998658 | 0.00150095 | 0.028173231 | 0.235030742 | 0.735265091 | 0 |
| 26 | 0.000343 | 0.013671 | 0.181629 | 0.804357 | 0 | 0 |
| 27 | 0.00000010498 | 0.0000229081 | 0.001874646 | 0.068181564 | 0.929920777 | 0 |
| 28 | 0.000357911 | 0.014049267 | 0.183827733 | 0.801765089 | 0 | 0 |
| 29 | 0.002601 | 0.096798 | 0.900601 | 0 | 0 | 0 |
| 30 | 0.037 | 0.963 | 0 | 0 | 0 | 0 |
| 31 | 0.000012167 | 0.001550499 | 0.065862501 | 0.932574833 | 0 | 0 |
| 32 | 0.002601 | 0.096798 | 0.900601 | 0 | 0 | 0 |
| 33 | 0.0009 | 0.0582 | 0.9409 | 0 | 0 | 0 |
| 34 | 0.001225 | 0.06755 | 0.931225 | 0 | 0 | 0 |
| 35 | 0.000050653 | 0.003955041 | 0.102937959 | 0.893056347 | 0 | 0 |
| 36 | 0.00000006554 | 0.00001612186 | 0.001487241 | 0.06097689 | 0.937519682 | 0 |
| 37 | 0.019 | 0.981 | 0 | 0 | 0 | 0 |
| 38 | 0.0000032768 | 0.000188416 | 0.004333568 | 0.049836032 | 0.286557184 | 0.659081523 |
| 39 | 0.000003375 | 0.000664875 | 0.043660125 | 0.955671625 | 0 | 0 |
| 40 | 0.0016 | 0.0768 | 0.9216 | 0 | 0 | 0 |
| 41 | 0.0000248832 | 0.000912384 | 0.013381632 | 0.098131968 | 0.359817216 | 0.527731917 |
| 42 | 0.000625 | 0.04875 | 0.950625 | 0 | 0 | 0 |
| 43 | 0.015376 | 0.217248 | 0.767376 | 0 | 0 | 0 |
| 44 | 0.00000625 | 0.000475 | 0.0135375 | 0.171475 | 0.81450625 | 0 |
| 45 | 0.000110592 | 0.006580224 | 0.130507776 | 0.862801408 | 0 | 0 |
| 46 | 0.043 | 0.957 | 0 | 0 | 0 | 0 |
| 47 | 0.000032768 | 0.002973696 | 0.089954304 | 0.907039232 | 0 | 0 |
| 48 | 0.000166375 | 0.008575875 | 0.147349125 | 0.843908625 | 0 | 0 |
| 49 | 0.0025 | 0.095 | 0.9025 | 0 | 0 | 0 |
| 50 | 0.000857375 | 0.024502875 | 0.233422125 | 0.741217625 | 0 | 0 |

$^a$The transmission line does not provide this capacity.

TABLE 4

(continued after Table 3) Probability distribution of the states for 85 transmission lines

| Transmission line $w_c$ | Capacity | | | | | |
|---|---|---|---|---|---|---|
| | 0 MW | 100 MW | 200 MW | 300 MW | 400 MW | 500 MW |
| 51 | 0.00000150063 | 0.000165498 | 0.006844504 | 0.1258085 | 0.867180001 | 0 |
| 52 | 0.000625 | 0.04875 | 0.950625 | 0 | 0 | 0 |
| 53 | 0.004225 | 0.12155 | 0.874225 | 0 | 0 | 0 |
| 54 | 0.000012167 | 0.001550499 | 0.065862501 | 0.93257483 | 0 | 0 |
| 55 | 0.06 | 0.94 | 0 | 0 | 0 | 0 |
| 56 | 0.000059319 | 0.004385043 | 0.108051957 | 0.88750368 | 0 | 0 |
| 57 | 0.083 | 0.917 | 0 | 0 | 0 | 0 |
| 58 | 0.00002541168 | 0.001329997 | 0.026103538 | 0.22770129 | 0.744839768 | 0 |
| 59 | 0.007396 | 0.157208 | 0.835396 | 0 | 0 | 0 |
| 60 | 0.000300763 | 0.012564711 | 0.174968289 | 0.81216624 | 0 | 0 |
| 61 | 0.098 | 0.902 | 0 | 0 | 0 | 0 |
| 62 | 0.00050625 | 0.011475 | 0.0975375 | 0.368475 | 0.52200625 | 0 |
| 63 | 0.000042875 | 0.003546375 | 0.097778625 | 0.89863213 | 0 | 0 |
| 64 | 0.000841 | 0.056318 | 0.942841 | 0 | 0 | 0 |
| 65 | 0.007 | 0.993 | 0 | 0 | 0 | 0 |
| 66 | 0.004356 | 0.123288 | 0.872356 | 0 | 0 | 0 |
| 67 | 0.00000576480 | 0.000447537 | 0.013028801 | 0.16857673 | 0.817941169 | 0 |
| 68 | 0.00006633829 | 0.001940168 | 0.022697306 | 0.13276369 | 0.388288334 | 0.45424416 |
| 69 | 0.00004745832 | 0.002097315 | 0.034757306 | 0.25600361 | 0.70709431 | 0 |
| 70 | 0.004225 | 0.12155 | 0.874225 | 0 | 0 | 0 |
| 71 | 0.000064 | 0.004608 | 0.110592 | 0.884736 | 0 | 0 |
| 72 | 0.0081 | 0.1638 | 0.8281 | 0 | 0 | 0 |
| 73 | 0.001 | 0.027 | 0.243 | 0.729 | 0 | 0 |
| 74 | 0.08 | 0.92 | 0 | 0 | 0 | 0 |
| 75 | 0.000274625 | 0.011851125 | 0.170473875 | 0.81740038 | 0 | 0 |
| 76 | 0.00000008352 | 0.00001931792 | 0.001675545 | 0.06459062 | 0.933714432 | 0 |

TABLE 4-continued (continued after Table 3) Probability distribution of the states for 85 transmission lines

| Transmission line $w_c$ | Capacity | | | | | |
|---|---|---|---|---|---|---|
| | 0 MW | 100 MW | 200 MW | 300 MW | 400 MW | 500 MW |
| 77 | 0.06 | 0.94 | 0 | 0 | 0 | 0 |
| 78 | 0.001 | 0.027 | 0.243 | 0.729 | 0 | 0 |
| 79 | 0.004913 | 0.071961 | 0.351339 | 0.571787 | 0 | 0 |
| 80 | 0.0009 | 0.0582 | 0.9409 | 0 | 0 | 0 |
| 81 | 0.007056 | 0.153888 | 0.839056 | 0 | 0 | 0 |
| 82 | 0.055 | 0.945 | 0 | 0 | 0 | 0 |
| 83 | 0.033 | 0.967 | 0 | 0 | 0 | 0 |
| 84 | 0.00000000515 | 0.00000114551 | 0.000101846 | 0.00452754 | 0.100634781 | 0.89473469 |
| 85 | 0.00000000016 | 0.0000000724 | 0.00001301879 | 0.00117051 | 0.052619638 | 0.94619676 |

In the embodiment, the method of assigning transmission line are executed on a personal computer with Intel Core 2 Quad CPU 2.4G and 2G RAM. Firstly, set the initial parameters: the population 0=50, the crossover probability $\alpha$=0.8, and the mutation probability $\beta$=0.05. There are 12 paths from Pingtung County to Taipei City: $\{\alpha_9, \alpha_8, \alpha_7, \alpha_6, \alpha_5, \alpha_4, \alpha_3, \alpha_2, \alpha_1\}$, $\{\alpha_9, \alpha_8, \alpha_7, \alpha_6, \alpha_{14}, \alpha_{13}, \alpha_{12}, \alpha_{11}, \alpha_{10}\}$, $\{\alpha_9, \alpha_8, \alpha_7, \alpha_6, \alpha_{24}, \alpha_{23}, \alpha_{22}, \alpha_{26}, \alpha_{25}\}$, $\{\alpha_{18}, \alpha_{17}, \alpha_{16}, \alpha_{15}, \alpha_5, \alpha_4, \alpha_3, \alpha_2, \alpha_1\}$, $\{\alpha_{18}, \alpha_{17}, \alpha_{16}, \alpha_{15}, \alpha_{14}, \alpha_{13}, \alpha_{12}, \alpha_{11}, \alpha_{10}\}$ . . . etc. The data of the electric power transmitted from Pingtung County to Taipei City are practically collected over a long-term period. The demand therefore is decided from the statistics database with considering several demand levels: 500 MW, 600 MW, 700 MW and 800 MW. The number 58 of the transmission lines are selected among the number 85 of the transmission line and distributed on the arcs from $\alpha_1$ to $\alpha_{58}$ of the TPTN. The algorithm is executed 10 times for each demand level to observe the largest maximum network reliability, the average maximum network reliability, the largest CPU time, and the average CPU time. In particular, set the generation number 2=500 for the power demand d=500 MW in the stage of the evolution process; A=1000 for d=600 MW; 1=1500 for d=700 MW; and 2=2000 for d=800 MW. The experimental results summarized in Table 5 indicate that the maximum network reliability is able to be found in a reasonable time. The number of generations is enough to obtain high network reliability for each demand.

TABLE 5

The experimental results of FIG. 3.

| Demand (MW) | Largest maximal network reliability | Average maximal network reliability | Largest CPU time (unit: second) | Average CPU time (unit: second) |
|---|---|---|---|---|
| 500 | 0.9999888656085086 | 0.9998755532992685 | 2382 | 1748 |
| 600 | 0.9996007679936616 | 0.9829716841101065 | 6594 | 4515 |
| 700 | 0.9978358209166093 | 0.9622463936390363 | 8953 | 6624 |
| 800 | 0.9868658440635382 | 0.9531141794069417 | 7279 | 4694 |

Above all, the invention provide a method for assigning transmission line of electric network based on the network reliability to performance stable power delivery for the supplier transmitting the specific power demand to the requester, to decrease the cost and to increase the performance index.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to is understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims.

Moreover, no element and component in the present disclosure is intended to be dedicated to the public regardless of whether the element or component is explicitly recited in the following claims.

What is claimed is:

1. A method for assigning transmission line of electric network, utilized to evaluate a network reliability for each of plural transmission assignments to select an optimal transmission assignment among the transmission assignments, wherein each of the transmission assignments has a source, at least one relay node, a sink, and plural transmission lines, and the transmission lines comprise a first transmission line and a second transmission line, the steps of the method comprising:

assigning the first transmission line between the source and the relay node and the second transmission line between the relay node and the sink to form one of the transmission assignments, wherein the states of the first transmission line and the second transmission lines are different;

computing the network reliability for each of the transmission assignments, wherein relational operators of the network reliability comprise the states of the first transmission line and the second transmission line;

providing an algorithm for executing to generate two offspring transmission assignments for replacing two of the transmission assignments, wherein the network reliabilities for the two of the transmission assignments are minimum;

computing the network reliabilities for the two offspring transmission assignments;

selecting the optimal transmission assignment among the transmission assignments and the offspring transmission assignments, wherein the network reliability for the optimal transmission assignment is maximum;

utilizing a computer to execute a transmission line assigned software, the computer having an input unit, an operating unit and an output unit;

the input unit receiving power demand, the states of each of the transmission lines from an user inputting to the transmission line assigned software;

the operating unit performing the optimal transmission assignment; and displaying the optimal transmission assignment on the output unit.

2. The method for assigning transmission line of electric network of claim 1, wherein the relay node comprise a first relay node, a second relay node and a third relay node, the transmission lines comprise a third transmission line and a fourth transmission line, and the steps of the method further comprise: assigning the third transmission line between the first relay node and the second relay node and the fourth transmission line between the second relay node and the third relay node, wherein the states of the third transmission line and the fourth transmission line are different.

3. The method for assigning transmission line of electric network of claim 1, wherein the step of computing the network reliability comprises:

distributing a power demand into two paths between the source and the sink, wherein the transmission lines are arranged to form the two paths, and each of the transmission lines has plural capacities and a maximal capacity;

defining a current vector having a current of each of the paths, wherein the sum of the currents is equal to the power demand;

selecting the current vector for satisfying the current smaller than or equal to the maximal capacity;

transforming each of the current vectors into a corresponding capacity vector;

comparing the value between every two of the capacity vectors, removing the larger capacity vector, and the rest of the capacity vector defined as a lower boundary vector; and computing a probability for each of the capacity vectors larger than or equal to the lower boundary vector, and defining the probability as the network reliability.

4. The method for assigning transmission line of electric network of claim 1, wherein the algorithm comprise a genetic algorithm.

5. The method for assigning transmission line of electric network of claim 4, wherein the step of executing the algorithm comprises:

defining a count and a generation number, wherein the start value of the count is zero;

adding one to the count when executing the algorithm every time;

judging if the count equal to the generation number;

executing a roulette wheel selection to select two of the transmission assignments when the count smaller than the generation number, wherein the two of the transmission assignments are defined as two parent transmission assignments;

executing a crossover operation and a mutation operation to transform the two parent transmission assignments into two offspring transmission assignments.

6. The method for assigning transmission line of electric network of claim 5, wherein the generation number is set by an user of the method for assigning transmission line.

7. The method for assigning transmission line of electric network of claim 5, wherein the steps of judging if the count equal to the generation number comprise: if the count equal to the generation number, selecting the optimal transmission assignment among the transmission assignments and the offspring transmission assignments, wherein the network reliability for the optimal transmission assignment is maximum.

8. The method for assigning transmission line of electric network of claim 5, wherein the steps of judging if the count equal to the generation number comprise: ceasing the algorithm if the count larger than the generation number.

\* \* \* \* \*